United States Patent
Bareis et al.

(10) Patent No.: US 10,077,743 B2
(45) Date of Patent: Sep. 18, 2018

(54) HOT GAS VALVE

(71) Applicant: Borgwarner Esslingen GmbH, Esslingen am Neckar (DE)

(72) Inventors: Bernd Bareis, Taeferrot-Utzstetten (DE); Hans-Ulrich Gross, Leinfelden-Echterdingen (DE); Till Neumann, Baltmannsweiler (DE)

(73) Assignee: BORGWARNER ESSLINGEN GMBH, Esslingen am Neckar (DE)

( * ) Notice: Subject to any disclaimer, the term of this patent is extended or adjusted under 35 U.S.C. 154(b) by 350 days.

(21) Appl. No.: 14/621,361

(22) Filed: Feb. 12, 2015

(65) Prior Publication Data

US 2015/0226161 A1    Aug. 13, 2015

(30) Foreign Application Priority Data

Feb. 13, 2014 (DE) .................. 10 2014 101 800
Jan. 15, 2015 (DE) .................. 10 2015 100 546

(51) Int. Cl.
| | |
|---|---|
| F02M 26/73 | (2016.01) |
| F02M 25/07 | (2006.01) |
| F16K 49/00 | (2006.01) |
| F16K 41/02 | (2006.01) |
| F02D 9/10 | (2006.01) |

(Continued)

(52) U.S. Cl.
CPC ......... *F02M 25/0795* (2013.01); *F02D 9/106* (2013.01); *F02M 26/70* (2016.02); *F02M 26/73* (2016.02); *F16K 41/026* (2013.01); *F16K 49/005* (2013.01); *F02M 26/54* (2016.02); *Y10T 137/6579* (2015.04)

(58) Field of Classification Search
CPC ...... F16K 49/005; F16K 41/02; F16K 41/026; F16K 41/066; Y10T 137/6579; F02M 26/73

USPC .......................................................... 251/305
See application file for complete search history.

(56) References Cited

U.S. PATENT DOCUMENTS 6,039,069 A * 3/2000 Gonsior .............. F16K 27/0218
                                                            137/454.2
6,540,234 B1 * 4/2003 Atkinson ............. F16J 15/0825
                                                            277/314

(Continued)

FOREIGN PATENT DOCUMENTS

| DE | 4325169 C1 | 9/1994 |
|---|---|---|
| DE | 10 2007 000 217 A1 | 10/2007 |

(Continued)

*Primary Examiner* — Kevin Murphy

(74) *Attorney, Agent, or Firm* — Hackler Daghighian Martino & Novak

(57) ABSTRACT

A hot gas valve has a housing, in which a gas duct is formed with an inlet and an outlet, and a valve device for controlling the fluid flow through the gas duct. The housing has at least one cooling duct for liquid cooling of the housing, wherein the gas duct is shielded with respect to the housing by means of a thermal shield, which consists of a material which has a greater thermal stability than the material of which the housing consists. The valve device has a closure body situated in the gas duct, which closure body is held on a valve shaft mounted in the housing by means of at least one bearing. The bearing may consists of a material having good thermal conductivity. The valve shaft is sealed by an elastomer shaft sealing ring on the side of the bearing facing away from the gas duct.

26 Claims, 3 Drawing Sheets

(51) Int. Cl.
F02M 26/70 (2016.01)
F02M 26/54 (2016.01)

(56) References Cited

U.S. PATENT DOCUMENTS

| | | | |
|---|---|---|---|
| 6,655,134 B2 * | 12/2003 | Nakayasu | F01N 3/28 |
| | | | 251/214 |
| 6,912,993 B2 * | 7/2005 | Oyamada | F02M 37/043 |
| | | | 123/337 |
| 7,540,278 B2 | 6/2009 | Nanba | |
| 8,162,004 B2 * | 4/2012 | Albert | F16K 11/0525 |
| | | | 137/340 |
| 8,316,830 B2 | 11/2012 | Keefover et al. | |
| 9,464,602 B2 * | 10/2016 | Kuehnel | F01N 3/043 |
| 2007/0095334 A1 | 5/2007 | Nanba et al. | |
| 2010/0206406 A1 * | 8/2010 | Nakamura | F16K 1/2268 |
| | | | 137/544 |

FOREIGN PATENT DOCUMENTS

| | | | | |
|---|---|---|---|---|
| DE | 10 2008 057 128 A1 | 5/2010 | | |
| EP | 1420158 A2 * | 5/2004 | | F02D 9/1065 |
| WO | 2008 144686 A1 | 11/2008 | | |
| WO | WO 2013156221 A1 * | 10/2013 | | F01N 3/043 |

\* cited by examiner

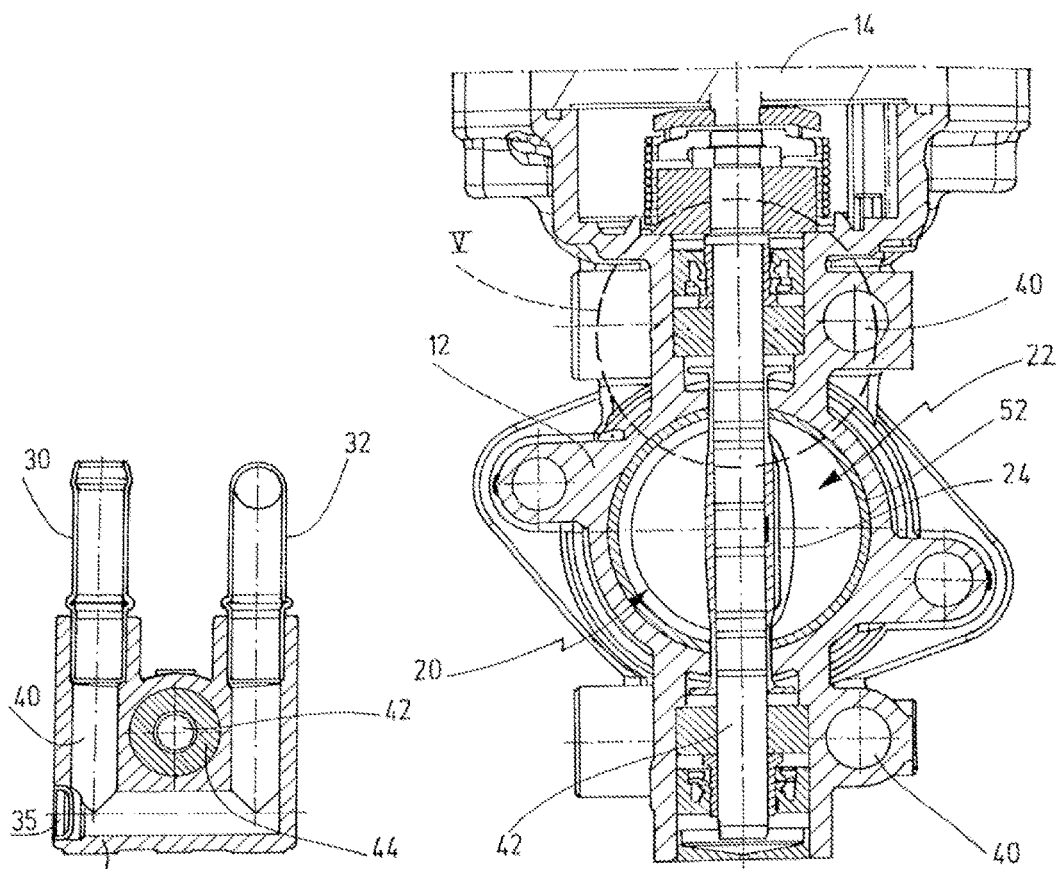
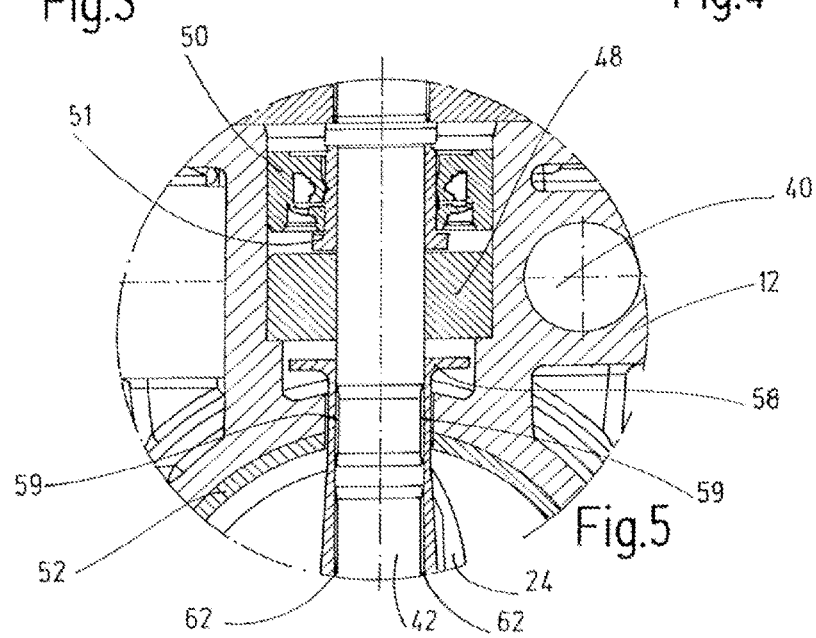

HOT GAS VALVE

CROSS-REFERENCE TO RELATED APPLICATIONS

This application claims priority to German Patent Application No. 10 2014 101 800.1, filed Feb. 13, 2014, and Application No. 10 2015 100 546.8, filed Jan. 15, 2015, the entire contents of which are hereby incorporated by reference.

DESCRIPTION

Field of the Invention

The invention refers to a hot gas valve. The hot gas valve can be an exhaust gas valve, in particular an exhaust gas return valve, hereinbelow referred to as an "EGR valve".

BACKGROUND OF THE INVENTION

Hot gas valves are known from DE 10 2007 000 217 A1 and US 2007/0095334 A1. These are EGR valves with a housing in which a gas duct with an inlet and an outlet is formed, and with a valve device, constructed as a flap, for controlling the fluid flow through the gas duct. The housing has a cooling duct for liquid cooling of the housing. The gas duct is shielded with respect to the housing by a thermal shield, which consists of a material which has a greater thermal stability/resilience than the material of which the housing consists. The valve device has a closure body situated in the gas duct, which is held on a valve shaft mounted rotatably in the housing by means of a bearing. In the hot gas valve known from DE 10 2007 000 217 A1, the housing is an aluminum pressure die casting product, and the shield is formed by a housing protection element, designated as a nozzle, for protecting a wall surface which defines the fluid duct in the housing. The hot gas valve is intended to be suitable for exhaust gases which have a higher temperature than 500° C. The housing protection element consists of a heat-resistant material, such as e.g. a high-grade steel or a heat-resistant steel. The bearing is formed by a metallic bushing which is not specified in further detail, or by a sintered oil bearing.

Despite the thermal shielding of the gas duct which is provided with respect to the housing, in the case of high fluid temperatures above 500° C. often an unacceptably high introduction of heat into the housing occurs, so that in particular a drive for the valve shaft arranged in or directly at the housing and containing electrical and electronic components is exposed to unacceptably high temperatures.

From WO 2008/144686 A1 a substantially similar hot gas valve is known without cooling ducts serving for liquid cooling of the housing, in which the valve shaft is mounted by a ball bearing or by a metal ring containing bronze and Teflon.

SUMMARY OF THE INVENTION

The invention is based on the object of improving a hot gas valve of the type mentioned in the introduction. This object is achieved by a hot gas valve having the features of the independent claims. Advantageous refinements of the invention are the subject matter of the dependent claims.

A hot gas valve according to the invention comprises a housing in which a gas duct is formed with an inlet and an outlet. The hot gas valve also comprises a valve device for controlling the flow of fluid through the gas duct. The housing has at least one cooling duct for liquid cooling of the housing. The gas duct is shielded with respect to the housing by means of a thermal shield. The shield consists of a material which has a greater thermal stability/resilience than the material of which the housing consists. The valve device has a closure body situated in the gas duct, which closure body is held on a valve shaft mounted in the housing by means of at least one bearing. The closure body can be constructed as a flap. The valve shaft can extend transversely through the gas duct. The valve shaft can be rotatably mounted in the housing. The valve shaft is sealed on the side of the bearing facing away from the gas duct by an elastomer shaft sealing ring. The bearing consists of a material with good thermal conductivity. The thermal conductivity of the bearing is so good that the heat which is introduced into the valve shaft by the hot gas situated in the gas duct is dissipated via the bearing to the housing and the cooling duct in a manner such that the elastomer material of the shaft sealing ring is not damaged. The material of which the bearing consists can have a thermal conductivity of more than 120 W/(m·K), in particular of at least 140 W/(m·K).

The invention has substantial advantages:

The hot gas valve is optimized such that its housing and its drive unit are exposed to as low temperatures as possible, although it is provided for high temperature applications above 500° C. and in particular is suited for exhaust gas temperatures up to 700° C.

The heat dissipation from the valve shaft to the cooling duct is substantially improved.

Shaft sealing rings consisting of an elastomer are only suited for "cold applications", in which temperatures are at most about 200° C. Their use in hot gas valves was therefore not possible hitherto, because much higher temperatures prevailed there. The present invention provides a hot gas valve in which the temperatures on the side of the bearing facing away from the gas duct can be reduced to such an extent that for sealing the valve shaft with respect to the housing a shaft seal can be used which is suitable only for "cold applications".

Over the relatively short distance from the gas duct to the shaft sealing ring, the invention enables a temperature reduction from the 700° C. of the gas flowing in the gas duct to no more than 200° C. at the shaft sealing ring.

Elastomer shaft sealing rings effect a particularly good sealing of the valve shaft. The undesired leakage of exhaust gas from the gas duct into the engine compartment can be greatly reduced by the invention. Such a low external leakage was hitherto not able to be achieved in hot gas valves of conventional type.

The temperatures of the section of the valve shaft leading to the drive can be distinctly reduced. Hereby, the heat input into the drive unit is greatly reduced. The electrical and electronic components of the drive are thereby protected from temperatures which are too high and their risk of failure is reduced. The reliability of the hot gas valve is thereby increased.

The thermal shielding of the gas duct with respect to the housing made of a thermally resistant (stable) material in connection with the liquid cooling of the housing permits the housing itself to be produced from a material which does not have to have any such high thermal stability/resilience. The housing can therefore consist of a light metal alloy, in particular an aluminum alloy and can be produced for instance by pressure die casting. Thereby, the hot gas valve according to the invention can be produced with little effort. A simple and cost-efficient production and a high precision can be guaranteed.

The bearing consisting of a material having good thermal conductivity can consist of graphite, ceramic or copper. Homogenous graphite material obtained by pressing a powder and sometimes called "electrographite" is suitable. A silicon carbide ceramic, which has a thermal conductivity of 120 W/(m·K) to 200 W/(m·K) and a coefficient of thermal expansion of $3.6 \cdot 10^{-6}$ 1/K to $4.1 \cdot 10^{-6}$ 1/K in the temperature range of 20° C. to 400° C. is suitable for example as ceramic material.

The shaft sealing ring can consist of a synthetic elastomer, in particular of a synthetic rubber, for example of EPDM. In an embodiment of the invention, the valve shaft can be thermally insulated with respect to the shaft sealing ring by means of a sleeve of a thermally insulating material, preferably polyimide. Thereby, the temperature load of the shaft sealing ring is further reduced. The shaft sealing ring then no longer touches the surface of the valve shaft directly, but rather surrounds the sleeve arranged on the valve shaft. With an exhaust gas temperature of 700° C., a temperature of the surface of the sleeve contacted by the shaft sealing ring of below 200° C. can be achieved, which is permanently non-critical for a shaft sealing ring consisting of EPDM.

In a further embodiment of the invention, a cooling duct can extend in the housing in the region of the bearing, which cooling duct in particular at least partially surrounds the bearing. In this way, the heat flow can be directed in a particularly good manner from the valve shaft via the bearing and the housing to the cooling duct, where the heat is dissipated via the coolant circulating there. The temperatures of the valve shaft, the bearing and the shaft sealing ring lying there behind can be thereby further reduced. The heat dissipation from the valve shaft to the coolant flowing in the cooling duct can be further improved when the bearing is received in the housing by means of a press fit.

In an embodiment of the invention, the valve shaft and/or the closure body can consist of a material with poor thermal conductivity, in particular steel. The steel can be a steel containing nickel and/or chromium, such as for instance a steel with the material number 1.4841. In this way, the heat transmission via the valve shaft to the housing and to the drive is further reduced.

In a further embodiment, the material of which the bearing consists can have a lower coefficient of thermal expansion than the material of which the valve shaft consists. The bearing gap between bearing and valve shaft, which causes a gap leakage, is thereby reduced with increasing temperatures during operation. The higher the temperature of valve shaft and bearing increases, the smaller the bearing gap becomes. Hereby, on the one hand the heat transmission from the valve shaft to the bearing is improved, so that the heat can be better dissipated from the valve shaft. On the other hand, the leakage through the bearing gap is considerably reduced. The amount of the hot gas which can arrive at the shaft sealing ring through the bearing gap is therefore reduced. This brings about a further reduction of the temperature load of the shaft sealing ring.

In a further embodiment of the invention, the valve shaft can be mounted in the housing on both sides of the gas duct respectively by means of a bearing. Hereby, a simple and reliable construction is achieved. In particular in this embodiment, the cooling ducts in the region of both bearings can be connected with one another by an overflow pipe. This results in a simple construction and the possibility of cooling both cooling ducts by a shared coolant flow. An inlet line for the cooling duct can be arranged on a side of the housing at which a drive for the valve is received. In this way, the delicate drive is arranged on the particularly well cooled side of the housing, at which the coolant feed is situated.

In an embodiment, the shield can be formed by a wall surrounding the gas duct. The gas duct can be surrounded by a wall of a material which has a greater thermal stability/resilience than the material of which the housing consists. The thermal shield, in particular the wall, can consist of steel. In this way, a particularly simple and cost-efficient production is the result. At least one air gap can be provided between the gas duct and the housing. In particular, at least one air gap can be provided between the shield and the housing. In this way, an even better thermal decoupling can be guaranteed between the gas duct carrying the hot gas or exhaust gas and the housing, which can consist, for example, of an aluminum alloy. The wall surrounding the gas duct can extend through a housing opening, in particular through a passage in the housing. Through the at least one air gap, the gas duct, or respectively the wall serving as a shield, is thermally insulated with respect to the housing. Hereby, the heat transmission from the hot gas duct to the housing is distinctly reduced.

The wall of the gas duct can be received in a preferably central contact region of the passage, wherein the wall next to the contact region, preferably on both sides, is surrounded by an annular gap. The annular gap can be arranged concentrically to a cylindrical wall and to the gas duct. In this way, the heat transmission from the hot gas duct to the housing is reduced still further.

On both sides of the gas duct, in the region of the housing adjoining the gas duct a cooling duct can be respectively provided. In this way, the heat transmitted from the hot gas duct to the housing can be dissipated directly via the cooling duct.

The valve shaft can be surrounded by a sleeve in a section situated between the closure body and the bearing. The sleeve can surround the valve shaft at its lead-through through the wall of the gas duct. In a section of the sleeve an air gap, in particular an annular gap, can be arranged between the valve shaft and the sleeve. The sleeve lies tightly against the closure body. The sleeve serves as a shield of the valve shaft with respect to the hot gas which flows in the gas duct and because of the presence of the sleeve no longer comes directly in contact with the valve shaft. The sleeve thereby guarantees a minor heat transmission from the exhaust gas to the valve shaft. The sleeve can have at its end facing the bearing a collar or a flange-shaped projection extending in circumferential direction of the sleeve. The collar serves as a labyrinth seal and deflects the hot gas, entering in axial direction of the valve shaft through the gap between the sleeve and the wall of the gas duct, in a radial direction, so that it does not strike directly onto the bearing.

At the inlet and outlet of the gas duct respectively a flange connection can be provided with a seal of a thermally insulating material, in particular of mica or phyllosilicate. Hereby, also, the heat transmission can be further reduced.

It shall be understood that the features of the invention mentioned above and to be further explained below are able to be used not only in the respectively indicated combination, but also in other combinations or in isolation, without departing from the scope of the invention.

BRIEF DESCRIPTION OF THE DRAWINGS

The accompanying drawings illustrate an embodiment of the invention.

FIG. 3 is a section through the housing along the line III-III according to FIG. 2;

FIG. 4 is a section through the housing transversely to the exhaust gas direction; and FIG. 5 is an enlarged detail V of the section according to FIG. 4.

DETAILED DESCRIPTION OF THE PREFERRED EMBODIMENTS

Figure 1:
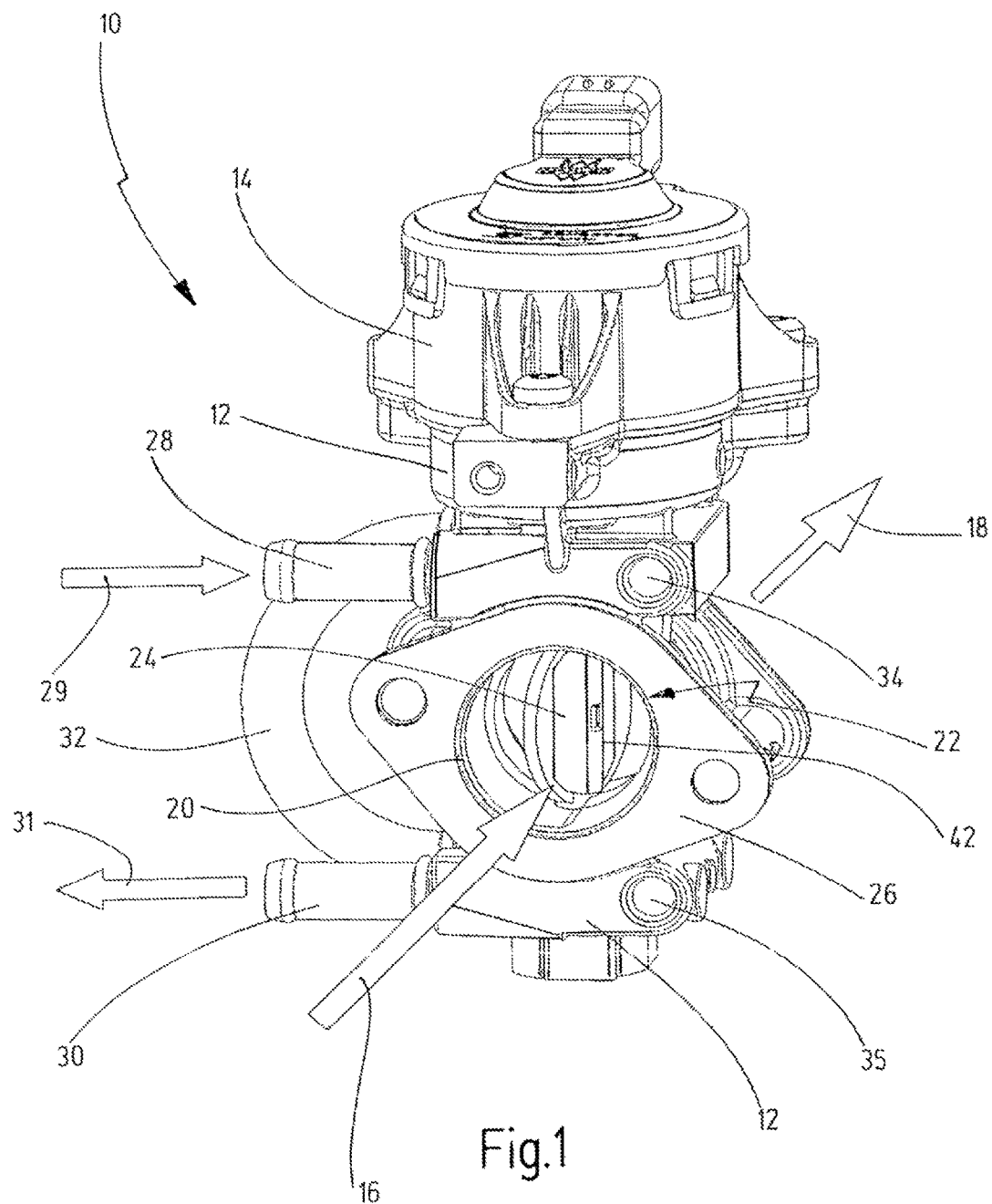
FIG. 1 is a perspective overall view of an embodiment of a hot gas valve in the form of an EEGR flap valve.

In FIG. 1 is an embodiment of a hot gas valve illustrated in perspective and is designated as a whole by the number 10. The hot gas valve 10 is an exhaust gas valve, namely an EGR valve, which is constructed as an EEGR valve (electrically operated exhaust gas return valve).

The hot gas valve 10 has a housing 12, at the upper end of which an electromotive or electromagnetic drive 14 is received. In the lower region of the housing 12 a gas duct 20 is formed, which is able to be connected to an exhaust gas pipe by means of a flange 26 on the inlet side and is able to be connected on the opposite side, likewise by means of a flange, to the exhaust gas return. The flow direction of the exhaust gas is indicated by the arrows 16, 18. A valve device, designated as a whole by number 22, which is constructed as a flap valve and has a closure body 24 in the form of a flap, is situated in the gas duct 20. The closure body 24 is held on a valve shaft 42, which is pivotable by means of the drive 14, in order to control the passage of gas through the gas duct 20.

In the region between the gas duct 20 and the drive 14, a cooling duct is situated, with an inlet connecting piece 28 into which coolant is able to be fed in the direction of the arrow 29. On the other side of the gas duct 20, i.e. on the side of the gas duct 20 facing away from the drive 14, a cooling duct is likewise situated for cooling the housing 12, at which an outlet connecting piece 30 is provided for the coolant return flow according to arrow 31. The cooling in the upper region and in the lower region are connected with one another via an overflow pipe 32, so that the cooling of the housing 12 can take place on both sides of the gas duct 20 by means of a single cooling water connection at the inlet connecting piece 28 and at the outlet connecting piece 30. In this case, the inlet connecting piece 28 is preferably situated in the region between gas duct 20 and drive 14, in order to enable a particularly intensive cooling in this region, so that the drive 14 can be advantageously accommodated in a plastic housing.

The housing 12 preferably consists of a light metal alloy, in particular an aluminum alloy, and can be produced for instance by pressure die casting. Through a special construction, it is ensured that despite the high thermal load by the exhaust gas flow, a housing 12, consisting for instance of an aluminum alloy, is also sufficiently thermally stable and that in addition the drive is only exposed to a minor thermal load. Therefore, the actuator or servomotor received for example in the drive 14 is not excessively loaded thermally, and furthermore the housing of the drive 14 can advantageously consist of plastic.

The various measures which lead to the thermal relief of the housing 12 and to the thermal decoupling of the drive 14 are described in further detail below.

Figure 2:
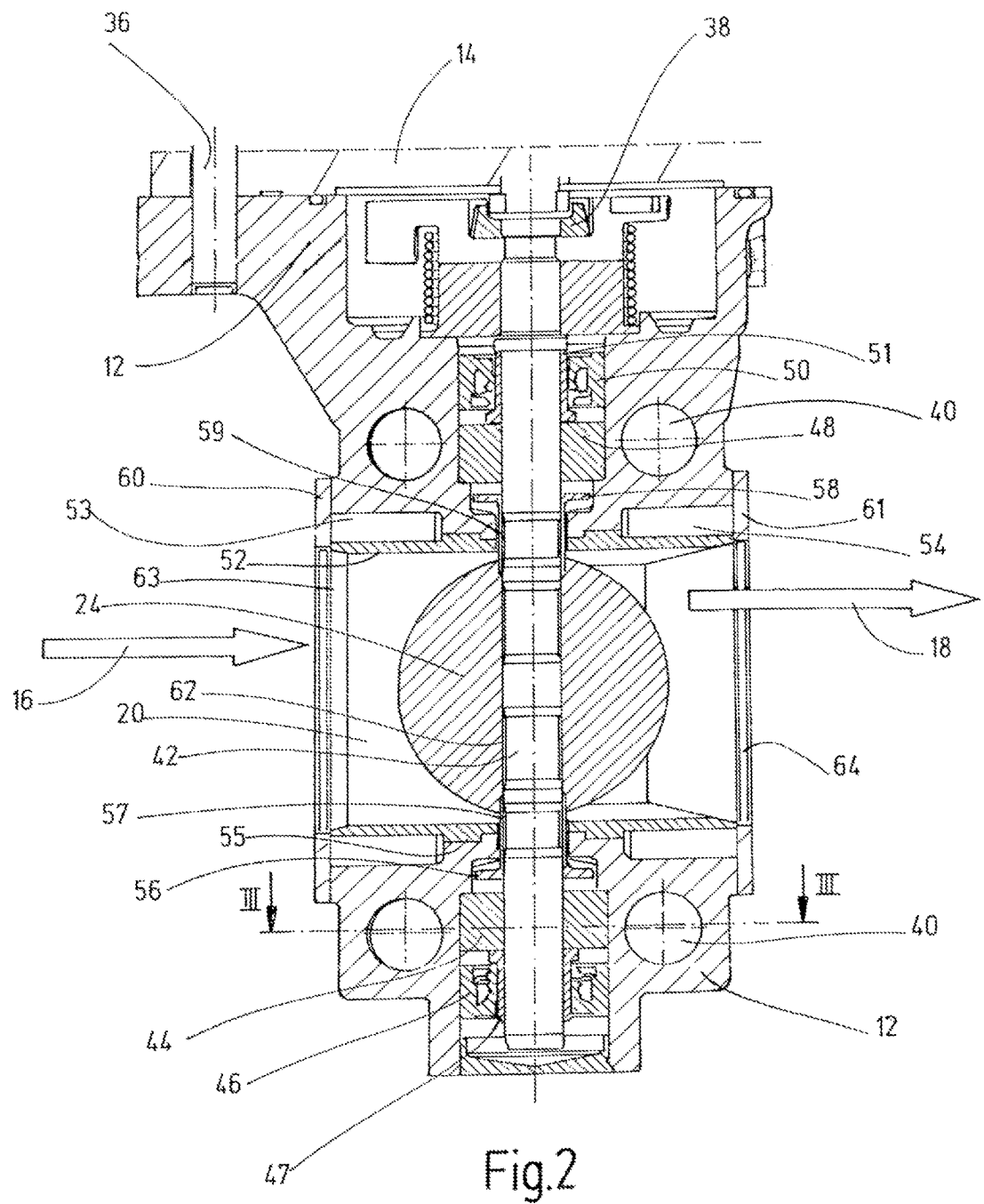
FIG. 2 is a longitudinal section through the hot gas valve according to FIG. 1.

According to FIG. 2, the valve shaft 42 is mounted within the housing 12 on both sides of the gas duct 20 respectively by means of a bearing 44 or respectively 48. A cooling duct 40 is provided in the housing 12, consisting of an aluminum alloy, in the immediate vicinity of the respective bearing 44, 48, through which cooling duct the respective bearing 44, 48 is respectively partially surrounded. The bearings 44, 48 preferably consist of graphite and therefore contribute to an effective heat dissipation from the valve shaft 42 directly to the cooling ducts 40.

As can be seen in further detail from FIG. 3, the cooling duct 40 surrounds the associated bearing 44 in a U-shaped manner, wherein on one side the outlet connecting piece 30 for the cooling water is connected and on the other side the overflow pipe 32 for connection with the cooling ducts 40 on the other housing side, facing the drive 14, is connected. The cooling ducts 40 can be produced during the production of the housing 12 by pressure die casting with the use of cores. The remaining opening in the cooling duct 40 is preferably closed respectively by a plug 35 according to FIG. 3 or respectively 34 in the other cooling duct according to FIG. 1.

As can be further seen from FIG. 2, the gas duct 20 extends transversely through an opening of the housing 12 and is surrounded by a cylindrical wall 52 of steel. The wall 52 extends through a passage in the housing 12 and forms a shield which prevents the hot exhaust gas situated in the gas duct 20 from coming directly in contact with the housing 12. The wall 52 extends continuously from the inlet 63 up to the outlet 64. The cylindrical wall 52 has a central annular contact region 55, in which it is secured at the housing opening. An annular gap 53 or respectively 54 extends on both sides of the contact region 55, whereby a good thermal insulation is produced with respect to the housing 12. The wall 52, consisting of steel, acts as a thermal shield with respect to the housing 12.

It can be further seen from FIG. 2 how the flap closure body 24 is fastened on the valve shaft 42. The closure body 24 is fastened on the valve shaft 42 in a central region and in two marginal regions. Gaps 62 extend therebetween, as can be clearly seen from the enlarged illustration according to FIG. 5, which surround the valve shaft 42 as annular gap. This results in a reduced contact surface between valve shaft 42 and the closure body 24, by which the heat transmission from the flap, exposed to the hot exhaust gases which flow through the gas duct 20 in the direction of the arrows 16, 18, to the valve shaft 42 is reduced. In this way, in particular the heat transmission to the drive 14 is reduced, which is connected with the valve shaft 42 via a coupling 38.

In the region of the respective lead-through of the valve shaft 42 through the wall 52 of the gas duct 20, the valve shaft 42 is surrounded respectively by a sleeve 56 or respectively 58, which sits on the valve shaft 42. Between the sleeve 58 and the wall 52 or respectively the housing 12 a narrow gap is situated, which enables the rotary movement of the valve shaft 42, as can be seen more precisely from the enlarged illustration according to FIG. 5. The sleeve 58 consists of steel. It has at its end facing the bearing 48 a collar or flange-shaped extension extending in circumferential direction of the sleeve 58, which collar or flange-shaped extension acts as a labyrinth seal and deflects a gas flow, entering in axial direction through the gap between sleeve 58 and wall 52, in radial direction away from the bearing 48 and towards the housing 12, so that a direct contact of the bearing 48 with hot exhaust gas is prevented. At its end facing the closure body 24, the sleeve 58 lies tightly against the closure body 24, in order to prevent a direct contact of the valve shaft 42 with hot exhaust gas. The sleeve 56 is constructed and arranged in an identical manner to the sleeve 58. An annular gap 57 or respectively 59 is situated between the sleeve 56, 58 and the valve shaft 42. Through these gaps 57, 59 the heat transmission from the hot gas to the valve shaft 42 is further reduced.

On the side of the bearings 44, 48, consisting of graphite, facing away from the gas duct 20, sealing ring 46 or respectively 50 is arranged. On the valve shaft 42 respectively a sleeve 47 or respectively 51 is arranged, which thermally insulates the valve shaft 42 to the respective shaft sealing ring 46, 50. The sleeves 47 or respectively 51 preferably consist of a thermally insulating material, such as polyimide for instance, and therefore contribute to the thermal separation of valve sealing ring 46, 50 and valve shaft 42. The sleeves 47, 51 constructed with a flange-shaped extension or collar serve as labyrinth seals with respect to exhaust gas from the gas duct 20 and prevent exhaust gas, which has arrived through the gap between valve shaft 42 and bearing 44, 48, from coming in contact on a direct path with the respective shaft sealing ring 46, 50. If a bearing 44, 48 were ever to come loose in its press fit to the housing 12, the sleeve 47 or 51 prevents the respective bearing 44 or 48 from an axial displacement.

The temperatures which occur in the region of the sealing rings 46, 50 were able to be reduced to approximately 180° C. and are thereby so small that sealing rings of EPDM are not damaged. With the hot gas valve 10, therefore, an extremely small external leakage can be achieved.

The leakage which occurs at the bearing gap between bearing 44, 48 and valve shaft 42 in the direction of the respective valve sealing ring 46, 50, is reduced during operation by increasing temperatures in the region of the bearings 44, 48, because the coefficient of thermal expansion of the bearing 44, 48 of graphite with approximately 5·10–6 1/K is substantially less than the coefficient of thermal expansion of the valve shaft 42 of steel, which lies in the range of approximately 17·10–6 1/K to 18·10–6 1/K (at 650° C.). Thereby, the valve shaft 42 expands with increasing temperatures during operation more intensively than the bearing 44, 48. The higher the temperature is, the smaller is the bearing gap.

The two housing surfaces at the inlet 63 and at the outlet 64 of the gas duct 20 are constructed in a flange shape and are provided respectively with a flange seal 60 or respectively 61, configured in an annular shape, of a thermally insulating material, such as for instance mica or phyllosilicate. Therefore, the heat transmission from the exhaust gas pipe, screwed on the flange 26 on the inlet side, to the housing 12 is reduced.

As a whole, through the described measures the heat transmission to the housing is reduced so intensively that it can consist, thermally totally unproblematically, of an aluminum alloy. At the same time, the heat transmission from the housing and from the valve shaft 42 to the drive 14, being flange-connected on the housing 12 and being fastened according to FIG. 2 by way of screws 36, is reduced such that the drive 14 can be received in a plastic housing and such that the sensitive components of an electromotive or electromagnetic drive along with electronic components are in no way thermally impaired.

LIST OF REFERENCE NUMBERS 10 hot gas valve
12 housing
14 drive
16 flow direction
18 flow direction
20 gas duct
22 valve device
24 closure body
26 flange
28 inlet connecting piece
29 coolant fluid direction
30 outlet connecting piece
31 coolant fluid direction
32 overflow pipe
34 plug
35 plug
36 screws
38 coupling
40 cooling duct
42 valve shaft
44 bearing
46 shaft sealing ring
47 sleeve
48 bearing
50 shaft sealing ring
51 sleeve
52 wall
53 annular gap
54 annular gap
55 contact region
56 sleeve
57 annular gap
58 sleeve
59 annular gap
60 flange seal
61 flange seal
62 air gap
63 inlet
64 outlet

What is claimed is:

1. A hot gas valve, comprising:
a housing, in which a gas duct comprising an inlet and an outlet is formed, and
a valve device for controlling flow of a fluid through the gas duct;
wherein the housing has at least one cooling duct for liquid cooling of the housing;
wherein the gas duct is shielded with respect to the housing by means of a thermal shield;
wherein the valve device has a closure body situated in the gas duct, which closure body is held on a valve shaft that is mounted in the housing by means of at least one bearing; and
wherein a thermally insulating sleeve is attached to the valve shaft and is sealed by an elastomer shaft sealing ring on a side of the bearing facing away from the gas duct, wherein the valve shaft is thermally insulated from the elastomer shaft sealing ring by means of the thermally insulating sleeve where the thermally insulating sleeve is disposed between the valve shaft and the elastomer shaft sealing ring.

2. The hot gas valve according to claim 1, wherein the material of which the bearing consists has a lower coefficient of thermal expansion than the material of which the valve shaft consists.

3. The hot gas valve according to claim 1, wherein the valve shaft and/or the closure body consists of a material having a thermal conductivity less than 120 W/(m·K).

4. The hot gas valve according to claim 3, wherein the valve shaft and/or the closure body consists of steel.

5. The hot gas valve according to claim 4, wherein the valve shaft and/or the closure body consists of steel containing nickel and/or chromium.

6. The hot gas valve according to claim 1, wherein the bearing is received in the housing by means of a press fit.

7. The hot gas valve according to claim 1, wherein the valve shaft is thermally insulated from the shaft sealing ring by means of the thermally insulating sleeve comprising polyimide.

8. The hot gas valve according to claim 1, wherein the at least one cooling duct extends in the housing in the region of the bearing.

9. The hot gas valve according to claim 8, wherein the at least one cooling duct at least partially surrounds the bearing.

10. The hot gas valve according to claim 8, wherein the valve shaft is mounted in the housing on both sides of the gas duct respectively by means of a bearing, and the at least one cooling duct in the region of both bearings are connected with one another by an overflow pipe.

11. The hot gas valve according to claim 10, wherein an inlet line for the at least one cooling duct is arranged on a side of the housing at which a drive for the valve is received.

12. The hot gas valve according to claim 1, wherein at least one air gap is provided between the thermal shield and the housing.

13. The hot gas valve according to claim 1, wherein the thermal shield is formed by a wall surrounding the gas duct, which wall extends through a passage in the housing.

14. The hot gas valve according to claim 13, wherein the wall surrounding the gas duct is received in a central contact region of the passage, wherein the wall next to the contact region is surrounded by an annular gap on both sides.

15. The hot gas valve according to claim 1, wherein the valve shaft is surrounded by a sleeve in a section situated between the closure body and the bearing.

16. The hot gas valve according to claim 15, wherein in a section of the sleeve an air gap is arranged between the valve shaft and the sleeve.

17. The hot gas valve according to claim 1, wherein an air gap is provided between closure body and valve shaft at least in one region.

18. The hot gas valve according to claim 1, wherein at the inlet and at the outlet of the gas duct respectively a flange connection is provided with a seal of a thermally insulating material.

19. The hot gas valve according to claim 18, wherein the thermally insulating material of the seal comprises mica or phyllosilicate.

20. The hot gas valve according to claim 1, wherein thermal shield consists of a material which has a greater thermal resilience than the material of which the housing consists.

21. The hot gas valve according to claim 1, wherein the thermal shield consists of steel and the housing consists of aluminum.

22. The hot gas valve according to claim 1, wherein the at least one bearing consists of graphite, ceramic or copper.

23. The hot gas valve according to claim 1, wherein the material of which the at least one bearing consists has a thermal conductivity of more than 120 W/(m·K).

24. A hot gas valve, comprising:
a housing, in which a gas duct comprising an inlet and an outlet is formed, and
a valve device for controlling flow of a fluid through the gas duct;
wherein the housing has at least one cooling duct for liquid cooling of the housing;
wherein the gas duct is shielded with respect to the housing by means of a thermal shield;
wherein the valve device has a closure body situated in the gas duct, which closure body is held on a valve shaft that is mounted in the housing by means of at least one bearing; and
wherein a thermally insulating sleeve is attached to the valve shaft and is sealed by an elastomer shaft sealing ring on a side of the bearing facing away from the gas duct, wherein the valve shaft is thermally insulated from the elastomer shaft sealing ring by means of the thermally insulating sleeve where the thermally insulating sleeve is disposed between the valve shaft and the elastomer shaft sealing ring; and
wherein the at least one bearing consists of graphite, copper or ceramic and has a thermal conductivity of more than 120 W/(m·K).

25. The hot gas valve according to claim 24, wherein the thermally insulating sleeve comprises polyimide.

26. A hot gas valve, comprising:
a housing, in which a gas duct comprising an inlet and an outlet is formed, and
a valve device for controlling flow of a fluid through the gas duct;
wherein the housing has at least one cooling duct for liquid cooling of the housing;
wherein the gas duct is shielded with respect to the housing by means of a thermal shield;
wherein the valve device has a closure body situated in the gas duct, which closure body is held on a valve shaft that is mounted in the housing by means of at least one bearing; and
wherein the valve shaft is sealed by an elastomer shaft sealing ring on a side of the bearing facing away from the gas duct, wherein the valve shaft is thermally insulated from the elastomer shaft sealing ring by means of a thermally insulating sleeve comprising polyimide; and
wherein the at least one bearing consists of graphite, ceramic or copper and has a thermal conductivity of more than 120 W/(m·K).

* * * * *